(12) United States Patent
Leonhardt et al.

(10) Patent No.: US 7,198,809 B2
(45) Date of Patent: *Apr. 3, 2007

(54) METHOD AND SYSTEM FOR REMOVING HARMFUL GASES FROM WINES AND OTHER BEVERAGES

(76) Inventors: Charles G. Leonhardt, 52 Cove Rd., Huntington, NY (US) 11743; James A. Morabito, 64 Felice Crescent, Hicksville, NY (US) 11801

( * ) Notice: Subject to any disclaimer, the term of this patent is extended or adjusted under 35 U.S.C. 154(b) by 0 days.

This patent is subject to a terminal disclaimer.

(21) Appl. No.: 11/416,097

(22) Filed: May 3, 2006

(65) Prior Publication Data

US 2006/0210679 A1 Sep. 21, 2006

Related U.S. Application Data

(63) Continuation-in-part of application No. 11/043,121, filed on Jan. 27, 2005.

(51) Int. Cl.
*C12G 1/00* (2006.01)
(52) U.S. Cl. .................. 426/15; 426/231; 426/238; 426/592
(58) Field of Classification Search .................. 426/11, 426/14–16, 234, 237–238, 592, 231
See application file for complete search history.

(56) References Cited

U.S. PATENT DOCUMENTS

| | | |
|---|---|---|
| 2,086,891 A | 7/1937 | Bachmann et al. |
| 2,088,585 A | 8/1937 | Chambers et al. |
| 2,138,051 A | 11/1938 | Williams |
| 2,196,193 A | 4/1940 | Chambers et al. |
| 2,775,434 A | 12/1956 | Probst |
| 3,746,897 A | 7/1973 | Karatjas |
| 4,210,676 A | 7/1980 | Dudar et al. |
| 4,350,708 A | 9/1982 | Ruiz de Palacios |
| 4,492,338 A | 1/1985 | Marelli |
| 4,576,824 A | 3/1986 | Gubiev et al. |
| 5,026,564 A | 6/1991 | Hayden |
| 5,062,548 A | 11/1991 | Hedderick et al. |
| 5,173,318 A | 12/1992 | Leu et al. |
| 6,313,565 B1 | 11/2001 | Puskas |
| 6,506,584 B1 | 1/2003 | Chandler et al. |
| 6,538,360 B2 | 3/2003 | Puskas |
| 7,063,867 B2 * | 6/2006 | Tyler et al. .................. 426/237 |
| 2003/0110951 A1 | 6/2003 | Tyler, III et al. |
| 2003/0194473 A1 * | 10/2003 | Redding et al. ............ 426/238 |

FOREIGN PATENT DOCUMENTS

| | | |
|---|---|---|
| EP | 0336262 A1 | 10/1989 |
| EP | 0860498 A1 | 8/1998 |
| FR | 2387409 A1 | 8/1993 |
| JP | 70013437 B | 6/1971 |
| JP | 356068385 A | 6/1981 |
| JP | 359042869 A | 3/1984 |
| JP | 403285670 A | 12/1991 |
| JP | 404088977 A | 3/1992 |
| JP | 407095873 A | 4/1995 |
| WO | WO2005/42178 A1 | 5/2005 |

* cited by examiner

*Primary Examiner*—Drew Becker
(74) *Attorney, Agent, or Firm*—Welsh + Flaxman LLC

(57) ABSTRACT

A method for removing entrained gases from wine by applying ultrasonic radiation to a solution containing wine ingredients at a frequency causing cavitation, optimizing the application of ultrasonic radiation to cause cavitation throughout the solution, and continuing the application of the ultrasonic radiation for a duration sufficient for the cavitation to remove entrained gases.

7 Claims, 2 Drawing Sheets

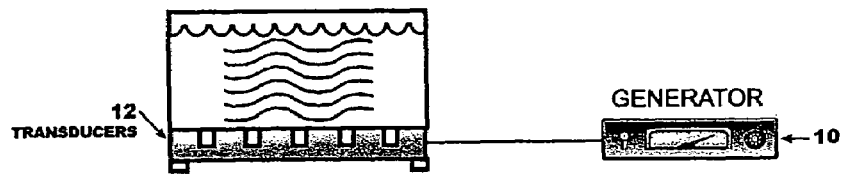
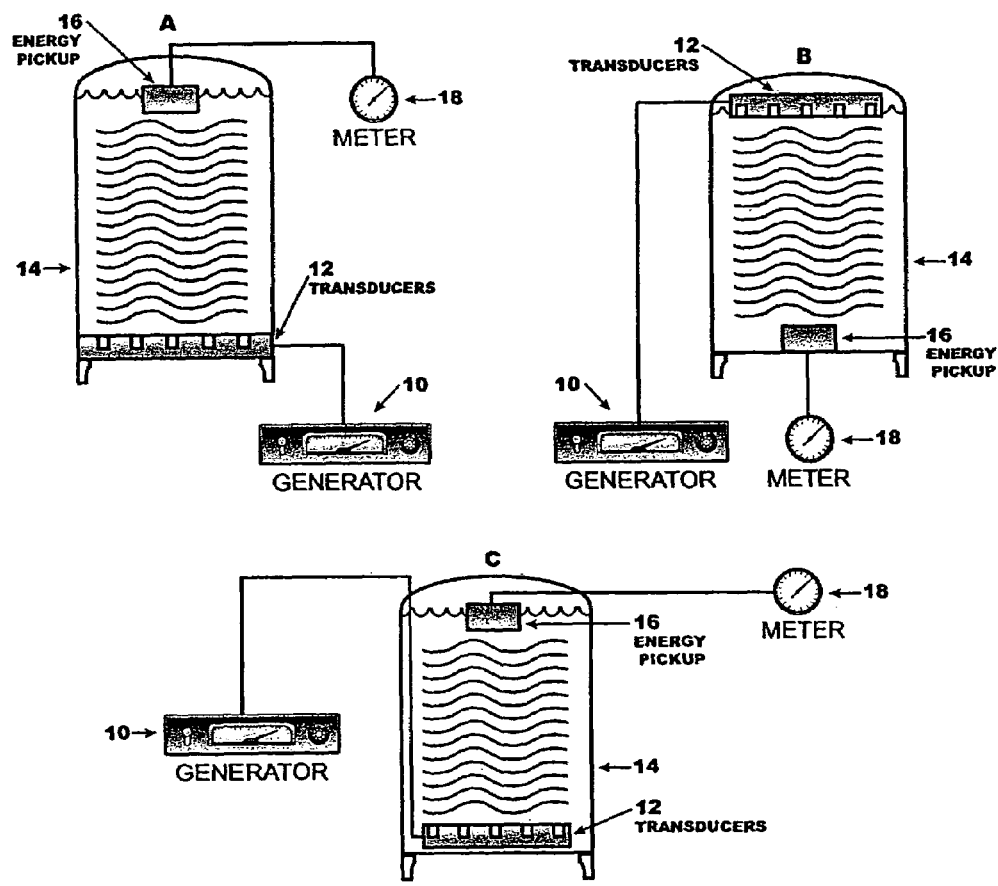
FIG. 2
FIG. 3

METHOD AND SYSTEM FOR REMOVING HARMFUL GASES FROM WINES AND OTHER BEVERAGES

CROSS REFERENCE TO RELATED APPLICATIONS

This application is a continuation-in-part of U.S. patent application Ser. No. 11/043,121, filed Jan. 27, 2005, entitled "WINE AGING METHOD AND SYSTEM", which is currently pending.

BACKGROUND OF THE INVENTION

1. Field of the Invention

The invention relates to a method and system for removing harmful gases from wine and other beverages. More particularly, the invention relates to the application of both pressure and temperature by ultrasonic radiation to remove harmful gases developed during the wine making process, for example, sulfite gases and alcohol gases.

2. Description of the Prior Art

Regrettably, while all wines will improve with some aging, peak flavor and bouquet traditionally require years to achieve and often deteriorate not long thereafter. Chemical interactions during the aging process are extremely complex and well documented. Suffice is to say that the desirable characteristics result from a long term blending of components of the wine.

The traditional process for aging wine is simple, well known, and well understood. In summation, wine is defined as an alcoholic beverage produced when fruit to be converted into a consumable product undergoes primary fermentation wherein yeast converts the sugar content in the fruit to alcohol. When the sugar supply is exhausted, the yeast dies off leaving the alcohol produced to blend with, or attach to, other components. Most wines are treated prior to bottling with certain additives, such as, potassium bisulfate, sodium bisulfate, and other conditioners and ingredients. However, it is left to the normal aging process to disperse these ingredients throughout the liquid.

The changes thereafter are subtle and difficult to establish, since there are no measurements other than taste and smell that can be used to determine when the aging is complete and when the wine invariably begins its decline. Further, the ingredients used vary between wines and wine producers and each ingredient may affect the aging process differently.

The various molecules in a wine will, over time, attach and/or blend imperfectly with each other. When attachment is complete, a degree of stability sets in for a period of time termed the "peak" of the wine. During this time the wine is at its most preferred state for consumption. Following the peak period of the wine's shelf life, the process of detachment begins. This is called "decline from peak" or "deterioration" and results in a loss of quality in the wine.

Aging is the degree upon which natural changes take place in the wine due to the interaction of the ingredients with each other and their environment. While it is normally accepted that alcohol is dispersed in certain liquids, this does not mean that a molecular blend is achieved. Blending of the ingredients is imperfect and, at the locations within the liquid where blending does occur, only the lowest energy reactions are permitted. Molecular bonds or changes in molecular structure are not necessarily achieved as these changes generally require higher energy than is available. The ingredients do tend to interact, attach, and change molecular characteristics in time, but they never realize complete molecular interaction, conversion, or bonding.

It has been found that the aging process in alcoholic beverages may be enhanced by application of high pressures and temperatures over time. While extremes in either may be detrimental to the aging process or the wine itself, the effects of controlled delivery can be highly desirable. One approach has been the use of supersonic sound waves to produce a thermo-dynamic and/or piezo-chemical change in fermented and distilled beverages corresponding to those changes possessed by a properly aged beverage. This is illustrated in U.S. Pat. No. 2,086,891 to Bachmann et al. The application of the supersonic waves improves the color, palatability, mellowness and bouquet in hours rather than the months or years needed for a similar result through normal aging.

This concept is seen again in Japanese Patent No. 356068385 to Sakai. Alcoholic beverages, such as sake, whisky, wine, brandy or liquor, are irradiated with ultrasonic waves for the purpose of accelerating the aging and maturation of the beverage. The ultrasonic wave radiation is administered in a frequency range of 16 to 60 kHz and is thought to cause acceleration of oxidation, polymerization, condensation, etc., of alcohol, aldehydes, esters and olefins in the subject liquid to form new substances with good flavor and body.

A further example of high frequency application of radiation to accelerate the aging process of alcoholic spirits can be found in U.S. Pat. No. 4,210,676 to Dudar et al. Ultrasonic irradiation of the spirits is applied while the subject liquid is circulated through a closed system. The radiation is applied at an energy of 1.7 Watts/liter, a frequency of between 20 and 50 kHz, and an average ultrasonic intensity of 0.5 Watts/cm$^2$. The liquid is in contact with a wood surface area and is circulated at a rate of 3 to 4 cycles per hour.

Similarly, U.S. Patent Application Publication No. 2003/0110951 to Tyler, III et al. discloses a process for rapidly aging alcoholic beverages during which the beverages are subjected to ultrasonic energy of at least 3 Watts/liter. The temperature is maintained between 90 F and 150 F while the alcohol is being subjected to the ultrasonic energy. The energy accelerates the maturation chemistry of the alcohol to produce a consumable product. The product is unique in flavor and smoothness in comparison to consumable alcohols aged under slower, more traditional processes.

The previous uses of high frequency radiation to accelerate the aging process suffer from several disadvantages when applied to wine making. First, the results from generation of high frequency radiation in a holding vessel containing a wine making solution will vary with the size of the vessel. The effects of the application of high frequency radiation diminishes with increased distance from the radiation source thereby reducing effectiveness in larger vessels. This is due to the nature of the contents of the solution and the loss of energy by the ultrasonic radiation as it comes into contact with the ingredients and as it travels over distance. Second, high frequency radiation travels in waves and changes in wine occur at locations in the solution corresponding to the frequency of the waves rather than throughout the vessel. Thus, the effects of the high frequency radiation are further diminished as they are not entirely experienced by the entire solution exposed to those levels of radiation capable of producing a desirable product. Third, and finally, the prior art techniques do not offer the most expedient or efficient method for producing a stable consumable wine product in the shortest amount of time possible. Ideally, a stable product with an extended peak period of taste and bouquet is most preferred. Further, as both time and energy are production costs, it is desirable to optimize both to obtain as large a profit margin as possible. While the previous uses for high frequency radiation claim to expedite production of alcoholic beverages, they do no provide an optimized method for producing a stable consumable product with an extended shelf life.

Attempts have been made to age alcoholic beverages at frequencies below the supersonic/ultrasonic ranges. For example, U.S. Pat. Nos. 2,088,585 and 2,196,193 to Chambers et al. discuss aging of alcoholic beverages using intermittent application of sound waves. The sound waves are preferably in the sonic range. The use of the lower frequencies creates cavitation sufficient to accelerate the aging of the alcohol. However, the use of the lower frequencies is undesirable as the resultant molecules are large and pressure points are farther apart creating cavitation voids.

In addition to concerns relating to the aging of wine, wine makers are known to add supplements to their wine as preservatives or to avoid the formation of extraneous bacteria. These supplements are generally added in an effort to prevent the development of characteristics adversely effecting the quality of the wine product. While these supplements offer benefits, for example, financial benefits relating to the preservation of wine, they are also known to have an adverse effect on the taste and overall quality of the wine.

Sulfite is among the most common and effective of additives used to inhibit extraneous bacteria growth in wine. Sulfite is effective in inhibiting extraneous bacteria growth in proportion to the amount of sulfite used in the wine. As such, large scale wine producers, whose risks are high, may use a higher concentration of additives, for example, sulfite, to avoid spoilage. However, with this addition of large amounts of sulfite, the quality of the wine is adversely effected.

Some smaller wine producers advertise that they do not use sulfite. This is important to many consumers and for good reason as consumers often complain of headaches which are attributed to sulfite usage and other additive usage. Although the relationship between the use of sulfites in wine and headaches has not been clinically affirmed, many believe the link is real. As such, wines not containing sulfite additives garnish a higher retail price, because manufacturing costs are higher and the risk of losing whole batches is on the high end of the scale.

It has been found that a significant cause for the adverse human effect of sulfite and other additives is the presence of extraneous undissolved entrapped gasses whether caused from sulfite additives or natural fermentation of wine ingredients. When wine having these additives is consumed, the entrained gases eventually enter the blood stream and are transported to the brain. This is believed to cause headaches (hangover) or perhaps other even more serious brain damage. Some people are more sensitive than others and refuse to drink wine containing additives because of the adverse effect. Sulfite gas is considered a noxious and harmful gas often used as an exterminating agent.

With the foregoing in mind, a need exists for a method and system of both aging wine and removing noxious gases from wine.

A need, therefore, exists for a method and system of aging wine in a dramatically expedited manner, with optimized energy costs, resulting in a stable product with extended peak period of taste and bouquet. The present invention provides such a method and system while producing a wine with improved taste and reduced side effects.

SUMMARY OF THE INVENTION

It is, therefore, an object of the present invention to provide a method for removing entrained gases from wine by applying ultrasonic radiation to a solution containing wine ingredients at a frequency causing cavitation, optimizing the application of ultrasonic radiation to cause cavitation throughout the solution, and continuing the application of the ultrasonic radiation for a duration sufficient for the cavitation to remove entrained gases.

It is also an object of the present invention to provide a method for removing entrained gases from wine wherein the ultrasonic radiation is applied in a frequency range between approximately 20 kHz and approximately 80 kHz.

It is another object of the present invention to provide a method for removing entrained gases from wine wherein the entrained gases are sulfite gases.

It is a further object of the present invention to provide a method for removing entrained gases from wine wherein the entrained gases are alcohol gases.

It is also an object of the present invention to provide a method for removing entrained gases from wine wherein the ultrasonic radiation is applied for between 15 minutes and 20 minutes.

It is still another object of the present invention to provide a method for removing entrained gases from wine wherein the application of ultrasonic radiation creates pressure amplitudes within the wine of at least 0.25 atm.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 2 is a diagram depicting an embodiment of the present system for application of ultrasonic radiation throughout a holding vessel.

FIG. 3 is a series of diagrams depicting three embodiments of the present system for application of ultrasonic radiation throughout a holding vessel.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to the attached drawings, a method and system for application of pressure and temperature generating chemical changes resembling natural aging in wine is disclosed. The method and system include use of ultrasonic radiation sufficient to induce molecular bonding between wine components. The molecular bonding occurs in a short period of time and results in a stable solution resembling wine aged over many years.

As discussed above, the traditional process for aging wine is simple, well known, and well understood. For the purposes of the present disclosure, wine is defined as an alcoholic beverage produced when wine ingredients are converted to a consumable alcoholic beverage. That is, wine is produced when fruit and other ingredients to be converted into a consumable product undergoes primary fermentation wherein yeast converts the sugar content in the fruit to alcohol. After the conversion, when the sugar supply is depleted, the yeast dies and settles to the bottom of the container. That is only the beginning of the aging process.

What is known and accepted is that the various molecules in a wine will, over time, attach and/or blend imperfectly with each other. When attachment is complete, a degree of stability sets in for a period of time termed the "peak" of the wine. During this time the wine is at its most preferred state for consumption. Following the peak period of the wine's shelf life the process of detachment begins. This is called "decline from peak" or "deterioration" and results in a loss of quality in the wine.

Figure 1:
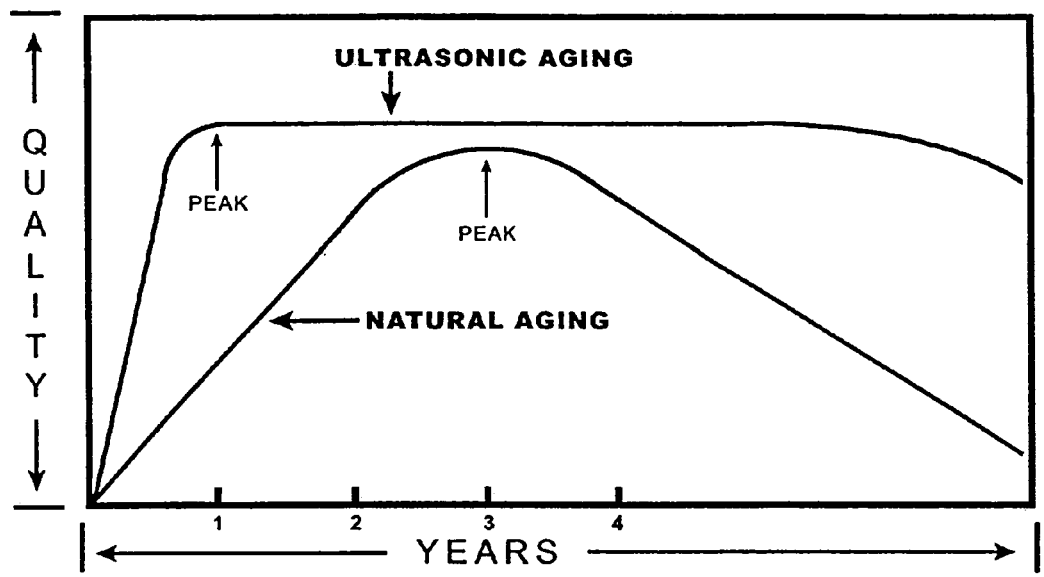
FIG. 1 is a graph comparing the peak period and speed of production of wine using the present invention versus that of wine undergoing natural aging.

FIG. 1 is a graphical depiction of the speed at which wine may be produced using the present invention and the extended duration of the peak period as compared to wine undergoing natural aging. The product acquired by the techniques taught herein is of better quality, having an extended peak period of bouquet and taste, than wine made in a traditional fashion. Further, the present invention allows for expedient production of a high grade product generating more product over time than is possible using natural aging.

The present method and system achieve molecular changes in structure of ingredients within wine through use of ultrasonic radiation, rather than mere blending and attachment. The ultrasonic radiation employed in accordance with a preferred embodiment of the present invention is in the form of wave patterns with a frequency above the audible range of approximately 20 kHz. Therefore, a practical approach to achieving the desired effect of molecular aging is to find frequencies in the particular wine being produced that maximize the energy released for driving molecular conversion of the wine components. The optimum frequencies produce small cavitation bubbles in sufficient quantities to drive molecular reactions between the ingredients. For common wines with common ingredients, ideal results have been produced in the resonant frequency range of approximately 40 kHz to approximately 80 kHz. However, as one familiar in the art can imagine, different ingredients will have different effects on the frequency range necessary to generate the optimum level of energy desired through cavitation. Any frequency above the audible range of approximately 20 kHz is sufficient to achieve the desired consumable product. Therefore, the range of 40 kHz to 80 kHz is in no way limiting on the use of the present invention.

Energy carried by ultrasonic waves impart areas, or locals, of increased pressure and temperature to liquid when applied thereto. The sound wave patterns have points of maximum pressure ("compression points") where this energy has its greatest influence on molecules within the liquid and points of zero pressure and maximum stress ("nodal points") where there is no influence on these same molecules. The present method and system take advantage of the properties of ultrasonic radiation by embodying the infusion of sound waves into wine at frequencies capable of producing cavitations in a controlled and optimized manner. The energy conveyed by the sound waves and the nature of their movement drives wine ingredients to form entirely new molecules. The end result is a stable solution whose components will not readily separate and revert to their original independent state. The peak period is thereby lengthened such that taste and bouquet will endure orders of magnitude longer than that which is achieved by other aging processes.

The objects of the present invention are achieved by causing cavitation within an aging wine through the use of an ultrasonic radiation generating device, such as a transducer. Cavitation is precipitated from the formation of vapor bubbles within a liquid at low pressure regions where the liquid has been accelerated to high velocities. This process is called "cavitation" because cavities form when the pressure of the liquid has been reduced to its vapor pressure. The vapor bubbles expand as they move and collapse suddenly when they reach regions of high pressure. The sudden and violent growth and collapse of these vapor cavities within a liquid cause intense shearing forces that result in emulsification. So powerful is the energy produced, measured as thousands of PSI in a minuscule area, it will erode steel over time. By subjecting wine to ultrasonic radiation at frequency thresholds above the level of cavitation in the wine, the components are compressed together under tremendous pressures as the cavitations bubbles implode, providing energy and force for molecular conversion of the wine components.

FIG. 2 depicts a system configuration available for achieving the objects of this invention. In this system, ultrasonic radiation generating device 12, driven by generator 10, delivers ultrasonic radiation throughout the wine ingredients. This configuration is particularly cost effective in small batch production of wine where an ultrasonic radiation generating device placed on the periphery of the system is sufficient to deliver ultrasonic radiation to the far corners of the containment vessel using relatively little energy. However, the same principles may be applied to large scale production of wine as well.

Most liquids, unless especially treated, contain entrained dissolved gas along with various impurities. A simple form of observation of how the entrained gas is extracted from the liquid is to observe a vessel containing water as you raise the temperature to approach its boiling point. As the temperature rises you will observe small gas bubbles forming, becoming larger, and rising to the surface as temperature is increased. Conversely, the formation of bubbles can be suppressed by increasing the hydrostatic pressure or by raising the boiling point of a liquid.

If sound waves in liquid have sufficient intensity to produce pressure amplitudes larger than hydrostatic pressure, the net external pressure becomes negative during the dilational portion of the waves (at the nodal points in the waves where pressure equals zero). It is at this stage that gas vaporized bubbles are formed. In the case of wine, the vaporized bubbles contain elements of alcohol, water, additives, and other various wine components of the liquid comprising the wine ingredients. The pressure portion of the wave, namely the compression points, compress the many elements within the bubble to the point of implosion. The force of the implosion releases energy while driving the wine components together. The resulting emulsion contains wine ingredients that have undergone molecular conversion into entirely new and stable molecules.

As a general rule of thumb, cavitation occurs in water with average sound intensities above $\frac{1}{3}$ Watt/cm$^2$, the threshold of cavitation. The size of the resulting cavitation bubbles are determined by the frequency of the sound waves applied. The higher the frequency, the smaller the cavitation bubble, the greater its surface tension, and the larger the energy release at implosion. That is to say, energy release is proportional to the frequency used. It is also true that there are fewer entrained gas bubbles available at extremely high frequencies.

The ingredients in wine do not require extremes much beyond the threshold of cavitation to achieve molecular conversion of wine ingredients. Where prior attempts at rapidly aging wine with sonic and ultrasonic radiation ignore energy costs and potential detriment to wine ingredients, the preferred embodiment of the present invention optimizes the ultrasonic radiation to deliver sufficient energy to cause cavitation throughout the liquid being processed and subsequent molecular conversion. Unless the energy is supplied at levels capable of causing cavitation throughout the liquid, the results will be negative and agglomeration of molecules will not take place. Conversely, if too much energy is applied, then the costs of production are increased and there is a good possibility of detriment to the product. By applying ultrasonic radiation at frequencies designed to cause cavitation and molecular conversion throughout the liquid, molecular changes take place throughout the solution and a homogenous, stable and desirable product is produced.

Creating even cavitation levels in large tanks, such as those used in commercial wine production, is a particular challenge. In accordance with the present invention, the choices are to increase the energy level or to place the ultrasonic radiation generating device in an optimal location to assure proper time and energy exposure. Where energy levels are increased, the ultrasonic radiation generating device could be placed anywhere in or around the vessel. The energy level is increased until proper levels of energy are provided at the farthest points from the ultrasonic radiation generating device. On the other hand, where it is not cost effective to increase energy levels, placement of the ultrasonic radiation generating device becomes paramount. In practice, it is desirable to take into account the size of the holding vessel for the solution, cost of equipment, and the subsequent energy costs of delivering ultrasonic radiation throughout the solution in the vessel to determine the both energy level and placement of the device.

FIG. 3 depicts three of the many configurations available for implementation of the present invention in both small and large batch wine production. In general, power is supplied by generator 10 to ultrasonic radiation generating device 12 or a collection of such devices. Each ultrasonic radiation generating device 12 applies ultrasonic radiation to the wine ingredients contained in the solution held in holding vessel 14. Further, pickup device 16 may be incorporated to optimize delivery of the ultrasonic radiation evenly and at energy levels to cause cavitation throughout holding vessel 14. Readings obtained by pickup device 16 may be displayed on visual display device 18, such as a meter or a digital display, or delivered to a computer system for display and/or interpretation. Changes in delivery of ultrasonic radiation may be made manually or by the computer system in response to the readings.

One of the possible configurations, designated embodiment "A" in FIG. 3, mounts an ultrasonic radiation generating device on a cable or other mechanism that allows it to be traversed within the tank to subject the entire batch to cavitation levels. The radiation generated in this fashion extends spherically around the device affecting more of the liquid it is submersed in at lower energy levels than if placed at an extreme end of the container.

Embodiment "B" illustrates another possible design that imparts upon an ultrasonic radiation generating device buoyancy sufficient for it to float on the top surface of the liquid. On the positive side, a floating device adds the benefit of operation independent of height of the liquid level. Thus the position of the device would not have to be altered depending on the amount of the liquid present for optimum exposure. On the negative side, this configuration requires higher power levels sufficient to create cavitation at the extreme bottom of the vessel than in the submersed design and less beneficial reflections due to the acoustic impedance of the tank bottom, liquid within, and air.

Embodiment "C" provides yet another design possibility in which an ultrasonic radiation generating device is placed in or around the subject liquid. The ultrasonic device may be fixed in position, removably fixed in position, or movable. As with embodiment B, this configuration requires high power levels sufficient to create cavitation at an extreme distance from the device.

Placement of a device may be combined with placement of another device to deliver ultrasonic radiation from multiple vantage points. One advantage of this option is the ability to provide sufficient energy for cavitation throughout the liquid in light of the hindrance factors affecting the radiation as well as the loss in energy over distance. Further, the multiple ultrasonic radiation generating devices may each be set at different or varying frequencies. While devices exist capable of submitting more than one frequency alone (see U.S. Pat. No. 3,746,897 to Karatjas, U.S. Pat. Nos. 6,313,565 and 6,538,360 both to Puskas), the use of two or more devices is an alternative method for supplying multiple ultrasonic frequencies. The downside to use of multiple devices is the energy cost of driving each of the devices as opposed to a single device.

It becomes an equipment cost decision as to the type of ultrasonic radiation generating device configuration used since several approaches are technically feasible, whether for large scale production or small scale production. One method for ensuring the best conditions for aging is to place a pickup device, such as a piezoelectric pickup transducer, at a distant point from the source of ultrasonic radiation for reading the level of energy delivered by the ultrasonic radiation. A reading below the threshold of cavitation indicates energy is insufficient for producing the desired molecular changes throughout the solution. Taking measurements in this manner assures proper exposure of the entire liquid to the ultrasonic radiation. Further, the measurements permit the calibration of the device to ultrasonic levels ideal for cavitation in each wine made. Thereby use of ultrasonic radiation is optimized to create cavitations evenly throughout the solution by indicating if insufficient or excessive amounts of energy are used.

The pickup device may be designed to take any reading corresponding to the loss of energy of the ultrasonic radiation. Assuming the output of the ultrasonic radiation generating device is full delivery of ultrasonic radiation at the frequency it is calibrated to generate, a reading at a distant point from the device by a pickup device will indicate weakening in the ultrasonic radiation generated. For a more accurate reading, a second pickup device may be placed in proximity to, or incorporated into, the ultrasonic radiation generating device. Comparison of the readings between the first and the second pickup devices provides an accurate measurement of loss in energy over the distance between the pickup devices. Ideally, ultrasonic radiation measured at any two points within the solution should be uniform in order to provide resultant molecules of the same size and nature and thereby a uniform consumable wine product. A reading indicating otherwise provides an indication that the energy level should be increased to provide ultrasonic radiation at the far reaches of the holding vessel uniform with the ultrasonic radiation generated at the ultrasonic radiation generation device.

Similarly, a pickup device may be used to determine if excessive amounts of energy are applied to a wine solution. A reading indicating uniform ultrasonic radiation throughout a vessel, while desirable to produce a uniform product, may also indicate excessive use of energy. If the energy level is reduced and the reading still indicates uniformity, then excessive energy was used. In this way the energy applied may be reduced to an optimized level where cavitation still occurs and energy expenditure is at its lowest. In small batch processing, it may not be necessary to use a pickup since attention is small and cavitation is visibly obvious.

As noted above, the frequency of the sound wave will determine the size of any resultant cavitation bubble. The smaller the bubble, the greater the amount of energy released. This is because of the effects of surface tension under the following energy equation: $P_i=P_o+2a/R$, where "$P_o$" is the hydrostatic pressure, "a" is the surface tension, and "R" is the bubble radius. A rule of thumb is that the size of the bubble will be ten orders of magnitude smaller than the wavelength in a particular liquid, although the exact size is determinable by those skilled in the art.

In addition to determining the size of the bubbles, and thereby the amount of energy released, the frequency applied will determine the size of the resultant molecules formed through interaction of the ingredients. In the case of wine, the smaller the molecule produced the easier it is for the body to absorb. With alcohol and other wine ingredients such as sodium bisulfate, known causes of headaches and hangovers, this is of particular interest for reducing after effects to consumption. It follows that a higher frequency is desirable for generating smaller molecules in wine to reduce effects following consumption. Another advantage of a higher frequency is a shorter heat dissipation cycle at energy release. This becomes important if heat is detrimental to the quality of the end product.

Yet another consideration is that cavitations are not uniform throughout the fluid due to the nature of a sound wave. As noted above, a sound wave has a point of maximum pressure (its "compression point") and a point of zero pressure and maximum stress (its "nodal point"). It is at the nodal point where there is virtually no cavitation implosion and at the compression point where conditions are optimal for cavitation. If, for instance, a wavelength at 40 kHz in wine is 5/8" there will be no cavitations at intervals of 5/16". To overcome this problem and achieve equal dispersion throughout the liquid, a preferred embodiment of the present invention applies ultrasonic radiation at more than one frequency. Application of more than one frequency provides points of low pressure sufficient to generate cavitation throughout the fluid. That is to say, when subjecting wine to more than one frequency, one sound wave provides energy and force for cavitation where another sound wave does not.

Figure 4:
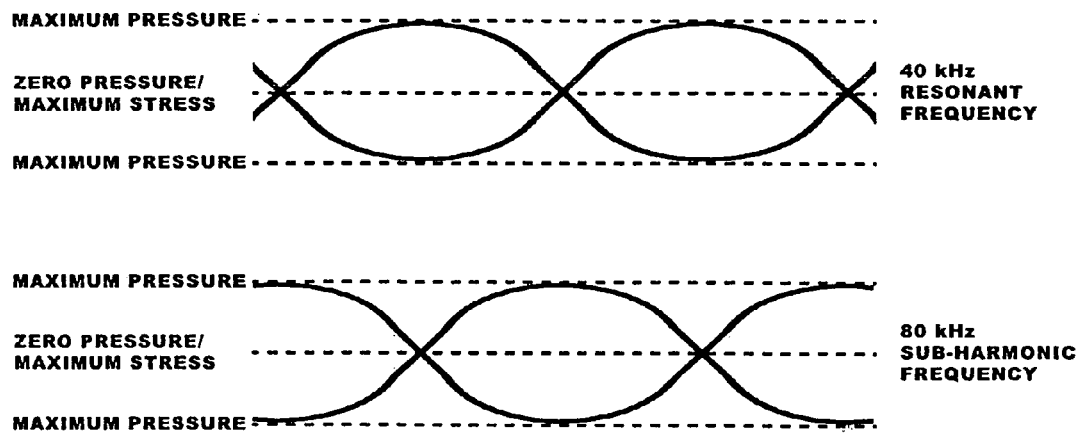
FIG. 4 is a diagram depicting application of ultrasonic radiation at both its resonant frequency and its sub-harmonic frequency.

FIG. 4 depicts one embodiment in which ultrasonic radiation is applied at both its resonant frequency and its sub-harmonic frequency. In this example, in the case of a transducer having a resonant frequency of 40 kHz, a second frequency is generated at its sub-harmonic frequency of 80 kHz. As another example, the method and system may be applied at a resonant frequency of 60 kHz, within the preferred range for resonant frequency, and its sub-harmonic of 120 kHz. Still another example delivers ultrasonic radiation at 30 kHz and its sub-harmonic frequency of 60 kHz. Where a resonant frequency and its sub-harmonic are used, the nodal points of one wave are located at the points of maximum pressure for the other wave. In any case, use of multiple frequencies provides energy sufficient to cause cavitation throughout the wine rather than at locals within the liquid corresponding to optimal areas for cavitation generated by a single wave frequency.

Multiple frequencies may be applied to wine in any number of ways. For example, it is possible to alternate between frequencies such that only one frequency, or group of frequencies, is applied at any one time. An alternative method is to apply frequencies of ultrasonic radiation in a sweeping pattern shifting from one frequency, or group of frequencies, to another frequency, or group of frequencies, throughout a range of frequencies. Yet another possible method is to apply frequencies simultaneously. In yet another method, any of these methods may be combined. For example, in one embodiment the frequency applied sweeps 3 kHz both sides of the resonant frequency and its sub-harmonic as well as alternating at fractional second intervals between the resonant and sub-harmonic frequencies. This achieves even distribution of energy and the breakdown of molecular characteristics to achieve the smallest molecular component uniformly throughout the solution. Further, this reduces the time of exposure needed for the desired molecular changes to occur and, therefore, reduces the cost of the process. But more important it reduces exposure time to the wine, minimizing the detrimental effect of heat generated through cavitation implosions.

In any of the methods for application of multiple frequencies the locals within the wine unaffected by one frequency are subjected to ultrasonic radiation sufficient to cause cavitation at another frequency. The result is a significant decrease in time needed to generate molecular changes in the wine components. In one experiment, for example, it was found that 5 gallons of wine subjected to cavitation levels at 14 different frequencies that sweep up to 3 kHz either side of 40 kHz and its sub harmonic of 80 kHz for a period of 15 minutes achieved the equivalent aging of 1 to 2 years. In other words, sweeping delivery of ultrasonic radiation at 37 kHz, 38 kHz, 39 kHz, 40 kHz, 41 kHz, 42 kHz, 43 kHz, 77 kHz, 78 kHz, 79 kHz, 80 kHz, 81 kHz, 82 kHz, and 83 kHz produced a wine ready to drink immediately upon bottling. In fact, with most wines it has been found that the duration of exposure for production of a desirable product ranges between 15 and 30 minutes. Exposure times between wines may differ, but the end result is extremely expedient production of a desirable product. It was also noted the sulfite measurement was taken before treatment and again after treatment indicating a reduction of 39%. This is largely attribute to molecular change due to agglomeration of components and degassing.

By subjecting wine to two or more frequencies, all above the threshold of cavitation, we alternately create different size cavitation bubbles at different locations throughout the liquid. The length of the sound wave largely determines where maximum energy release occurs (i.e., where implosion will take place). By operating at two or more frequencies we can achieve a more complete blend or agglomeration of the wine components which is important to the wine taste and bouquet. Generation of a resonant frequency and its sub harmonic frequency delivers energy throughout the liquid for causing cavitation. Similar results may be obtained using a resonant frequency and frequencies similar to the corresponding sub harmonic frequency. The temperature and pressure supplied by the ultrasonic radiation are both immediately and effectively dispersed independent of the temperature of the system, thereby achieving molecular changes without causing a detrimental effect. The time of exposure may vary slightly with the type of wine being processed due to the type and amounts of additives added in the normal course of wine making. The optimal frequencies to be applied and availability of entrained gas bubbles will also affect the duration of the process. However, due to the use of multiple frequencies to permeate the wine with locations for cavitation, the time and energy required to induce molecular changes in the wine components is greatly decreased.

There is a practical limit to the use of ultrasonic radiation due to the amount of power needed to create cavitations. The higher the frequency, the larger the release in energy on implosion, but at a cost of increased energy for creating cavitation. Moreover, energy depletes the further from the source device one gets. Thus, use of higher frequencies requires even greater power to reach the threshold of cavitation throughout a large vessel. In a large containment vessel, it is possible to provide ultrasonic radiation sufficient to cause cavitation in close proximity to the ultrasonic delivery device used while in more distant areas of the vessel having insufficient energy to cause cavitation and the resultant molecular changes in the wine. Further, cavitation will also attenuate the sound waves themselves, thus limiting the effective distance of transmission. Entrained dissolved gases within the liquid essentially have the same acoustic impedance as the liquid. Once the cavitation gas bubble is formed its acoustic impedance changes forming a barrier to sound transmission. Still further, the shape of the bubble also tends to scatter and divert the sound wave. Finally, energy is also dissipated through the implosion of the gas bubbles.

The present invention overcomes these limitations by optimizing the energy applied in every part of the holding vessel containing wine ingredients. Application of ultrasonic radiation sufficient to produce cavitation throughout the vessel physically changes the composition of the entire solution. General application of ultrasonic radiation, on the other hand, only changes the composition at specific locals within the solution dependant on the wavelength of the ultrasonic radiation applied as well as the extent to which the radiation is capable of delivering sufficient energy for cavitation at points distant from the radiation source.

It is important that ultrasonic radiation be used in the proper stage of wine production. Since ultrasonic radiation applied above certain power levels is known to destroy some bacteria and disrupt cellular structure, it should not be used during primary fermentation. It is important to allow the yeast to do its job unhindered. After the wine has reached a satisfactory level of fermentation, ultrasonic radiation sufficient to cause cavitation may be applied without fear of killing the yeast or disrupting the fermentation process prematurely.

As discussed above, certain wine additives are added during the wine making process to inhibit growth of extraneous bacteria and to avoid what is termed "after fermentation". For example, ultrasonic radiation below the threshold of cavitation could be used as a vibrator to create new barriers for the yeast to attack. It would be necessary to conduct this action before the ultrasonic radiation at or above the levels of cavitation is applied as this could damage and kill the yeast necessary to complete fermentation. The costs of using ultrasonic radiation in this fashion would have to be measured against the benefits gained to see if they are justified for a particular application.

The beneficial effects gained through the present invention cannot be achieved through normal static or conventional aging processes simply because the conditions created in this ultrasonic process simply do not exist and cannot be duplicated by other means. In a normal aging process, many interactions take place, but it is the completeness of the blending of the components that determines bouquet, flavor, etc. Over time, and after blending has reached its peak, the components tend to separate and the wine starts to deteriorate. This invention changes the molecular structure, combining various components, and reducing their size by supplying high frequencies at levels sufficient to produce an intense field of cavitation. Therefore, this invention provides a better means of creating a quality wine product and prolonging wine life.

In addition to accelerating the aging process of wine, it has been found that the application of ultrasonic radiation to wine also removes harmful and noxious gases produced during the wine making process. In particular, and in accordance with a preferred embodiment of the present invention, the use of ultrasonic radiation is applied to remove gases associated with the application of sulfites and other additives to wine. The ultrasonic radiation is applied in a manner similar to the aging process described above. As is discussed below in greater detail, the application of ultrasonic radiation in this way produces cavitations which both dissolve entrained gases as well as emit gases. In other words, the present technique functions to degas the wine.

When sulfite, for example, is added to wine, it is usually in powder form. The sulfite is then dissolved and dispersed within the wine. As the additive dissolves, the gases contained therein become entrained in vaporized, dissolved, or other complex configuration and remain in the liquid. When ingested, the gases enter the blood stream and are transported throughout the body and brain. The present invention removes these entrained entrapped gases without adversely effecting the preservative aspect to which they were applied or intended.

As those skilled in the art will appreciate, alcohol is an integral component of wine, and like most liquids, contains entrained gases. However, alcohol is not considered to be an additive of wine. When the wine is consumed, its effect upon the brain is obvious. As with the removal of sulfite associated gases, application of the present invention also removes these entrained alcohol gases. Removal of alcohol entrained gases from the wine, along with altering molecular structure, reduces some of its adverse effects.

In accordance with the present invention, the wine is subjected to ultrasonic radiation at a level sufficient to produce cavitation. By subjecting the wine to ultrasonic radiation at this level, the entrained gases associated with alcohol and sulfite additives are removed and a cavitation bubble is formed. Depending upon the level of energy intensity and frequency of the applied ultrasonic radiation, the force and bubble size are determined. For purposes of removing entrained gases, the operating frequency is not necessarily sensitive. For purposes of agglomeration and achieving a fine molecular structure, frequency becomes a factor. It is contemplated in accordance with a preferred embodiment of the present invention that for removal of entrained gases and achieving reasonable coverage throughout the treatment vessel, practical frequencies employed will range from between approximately 20 KHz to approximately 80 KHz. However, those skilled in the art will appreciate that this range is not critical and may be varied without departing from the present invention. It is contemplated there are frequencies that will work beyond the preferred range of 20 kilohertz to 80 KHz. However, at frequencies below 20 KHz audible sound is created which may be harmful to personnel working the immediate area. When the wavelength is longer, one sacrifices coverage and concentration of heat. The agglomeration resulting from the use of longer wavelengths will produce larger molecules, sacrificing quality. Above 80 KHz power becomes a factor when propagating sound over distance; entrained vapor to create cavitations are fewer, offering no advantage to operation at a higher frequency.

It is important stress that it is desirable to achieve results in the shortest period of time. To accomplish this we strive to achieve complete coverage to avoid heat buildup. 500 watts of 20 KHz energy in five gallons will have the same heat buildup as 500 watts of alternating frequencies but will not have the same coverage because of standing wave patterns and large areas of voids due to wavelengths.

More particularly, most all liquids contain entrained and dissolved gases. Such gases may also be entrapped within particulate matter or in the form of vapor. This invention deals with removal of entrained gases and changing the molecular structure of wine by means of applying ultrasound to the liquid at or above a level that will cause cavitations throughout. In accordance with a preferred embodiment of the present invention, it desirable to achieve the smallest combined molecule that is a combination of all ingredients without degradation due to heat. After exposure, the dissolved gas is combined and longer a separate entity of the wine, which explains the reduction in sulfite readings shown in the tests discussed below.

As briefly mentioned above, there are no specific advantages in exposing wine to energy levels above the cavitation threshold when one wishes to remove the detrimental entrained gases, in fact it can be detrimental to the flavor of wine if exposed for long periods of time due the intense heat generated within the cavitations bubble. Assuming even distribution and adequate power and pressure amplitudes to produce cavitations, exposure of between fifteen and twenty minutes is adequate. In accordance with a preferred embodiment of the present invention, the effect of cavitations is the primary focus and not the effect of heat on the wine. Cavitations are generally produced at sound intensities greater than $\frac{1}{3}$ watt/cm$^2$. For purposes of "degassing" or to change entrained gas to a liquid state pressure amplitudes are created within the liquid of at least 0.25 atm.

It is well documented and accepted that cavitation bubble size is determined by frequency. In agglomerating applications the molecule size is also determined by frequency. The objective of the present invention is to achieve the smallest practical molecular structure, removal of the smallest entrained gas component and agglomerating with other components to form a stable solution. To achieve that objective the present invention preferably employs the highest energy release over the shortest period of time to avoid heat buildup, with uniform coverage to avoid overexposure in concentrated areas. Because of attenuation considerations, selection of frequency is a trade off, especially when it involves large liquid volumes. It take greater power to propagate sound in liquid at higher frequency. The frequencies we choose are an optimal compromise and can be used in large and small batches.

Entrained gas, if untreated, remains in gaseous state and that is what is transmitted into the blood stream, along with large molecules of dissolved gas. Entrained gas has limited preservative effect on the wine while in this state and it adversely affects bouquet or taste, and may cause headache. Once dissolved the reverse is true. We also want the smallest molecular combination, agglomerated with other ingredients to form a stable solution, thus achieving the greatest beneficial effect from the additives. This will also have additional cost benefits by using less quantity of additives, and less health hazards from those additives, resulting in a smoother tasting product equivalent to complete aging. It should be noted that once the entrained gas is liquefied due to entrapment within the cavitation bubble it then becomes another liquid molecule that will be transformed once again by agglomerating with other wine ingredients, resulting in more complete preservation therein and lengthened peak period.

Some wine is more complex than others and contains many ingredients. This may result in the presentation of several rupture thresholds within its contents, and it may, therefore, be desirable to create pressure intensities in the range of 1.25 atm. It is hard to predict viscosity levels of every type of wine that may be conceived. Higher viscosity liquid will create power levels to create cavitations. Changes in liquid composition effect acoustic impedance, which in turn effect power levels to create rupture points. When you create cavitations you are in a sense rupturing the liquid at that point.

The size of the cavitation bubble is determined by sound frequency. Higher frequencies produce smaller cavitation bubble and fewer entrained gas molecules available to cavitate. Conversely, higher frequency application results in the release of greater energy at implosion. Therefore, it becomes a trade off in selecting power and frequency. In accordance with a preferred embodiment of the present invention, the primary concern is selecting a frequency that will produce a cavitation bubble of such size to encapsulate gas molecules within its formation, but not so small that they will not be processed. Sound intensity must be at a level to produce cavitations throughout the processing vessel.

To achieve desired results, the practical frequency for this purpose is in the range of 40 KHz to 80 KHz, and to obtain even coverage and alternate standing wave patterns, sweep 3 KHz either side of its nominal resonate frequency. This enables larger gas bubbles (streamers) to be released. Changing or sweeping frequency accomplishes a number of things, for example, it creates changes in wavelength to increase coverage and creates changes in standing wave pattern allowing large impediments (gas or solids) to either rise or fall. There is a microsecond switching time between frequencies, providing bursts of energy that accelerates this event. In accordance with a preferred embodiment of the present invention the switching between frequencies is not sinusoidal since it is more beneficial to alternate switch for the previously stated reasons, although this does not to rule out the use of a sinusoidal sweep.

By sweeping operating frequency, more complete coverage is achieved by changing standing wave patterns, the location of the nodal and compression point of the sound wave. It also allows the large harmful gas molecules to be emitted from the liquid.

EXAMPLE

In proving the effectiveness of the present invention, a sulfite testing kit (titrets for the determination of sulfite in wine), manufactured by CHEMetrics, Inc., Component Catalog No. A-9610T, was employed to monitor wine manufactured in accordance with the present invention.

Using a sample 5 gallon batch of a low cost commercially sold wine, a base line indication of sulfite content was determined. Thereafter, the wine was subjected to ultrasonic energy for 15 minutes at frequencies swept 3 kilohertz from both sides of a nominal frequency of 40 kilohertz. Once the ultrasonic energy was applied, the sulfite content was once again monitored. The final sulfite content indicated a reduction in sulfite content of 39%. In addition to the quantitative 39% reduction in sulfite content, there was a noticeable improvement in the smoothness and taste of the wine. We attribute the removal of entrained gases, agglomeration and overall change of the molecular structure to the reduced sulfite content and the improved taste.

While no testing has been done on other gasses that may be present in wine, the same principles that apply to sulfite gas would apply to other gases present in a liquid or wine.

While treatment of wine in accordance with the present invention results in "degassing" caused by cavitations, the treatment also affects the entire molecular structure of the wine. Within the embodiment of the cavitation bubble there are other molecules that are compressed to the point of agglomeration, this has the effect of accelerated and more complete aging process. Since the treated molecular structure is now created under such intense pressures it becomes a more stable solution that will lengthen its peak bouquet. In normal aging, a chemical reaction takes place over time, wherein the molecular ingredients tend to attach, some do some do not. There may not be a complete change or blending because it takes more than just sitting there and allowing a chemical event to take place. Entrained gas may never dissolve by itself and will always have an adverse effect when ingested in their pure form.

When the captured molecules are compressed within the cavitation bubble, compressed under thousands of pounds of pressure, they are fractured (ruptured), combined and transformed, equivalent to a more complete aging. Because of completeness of the event, they will not separate over time. Therefore, the peak life of the wine is lengthened. Entrained gases are dissolved. Liquid molecules are transformed, agglomerated and combined.

A simple but good analogy is oil and water. It can sit forever, separated in a vessel protected from evaporation. Oil has different viscosity, different acoustic impedance, different rupture points, and different specific gravity than that of water. Because of these differences, it will take greater energy to change molecular structure. Applying energy to oil above the point of rupture will permanently reduce viscosity. At that same high level of energy, (higher than needed to break down molecular arrangement of the water and oil ingredients), and over a relative short exposure time, one can achieve a stable oil/water solution that will not easily separate. We have created a totally different molecular size and structure of the oil/water solution. Its molecular size and configuration will be dependent on exposure time, power and frequency. All of the afore mentioned parameters; viscosity, acoustic, impedances, specific gravity have been altered in the resultant solution.

While the preferred embodiment has been shown and described, it will be understood that there is no intent to limit the invention by such disclosure, but rather, is intended to cover all modifications and alternate constructions falling within the spirit and scope of the invention.

The invention claimed is:

1. A method for removing entrained gases in the production of wine, said method comprising:
   applying ultrasonic radiation to a solution containing wine ingredients at a frequency causing cavitation;
   optimizing the application of ultrasonic radiation to cause cavitation throughout the solution; and
   continuing the application of the ultrasonic radiation for a duration sufficient for the cavitation to remove entrained gases;
   wherein the frequency at which the ultrasonic radiation is applied is two or more frequencies and the two or more frequencies are applied in a sweeping manner.

2. The method according to claim 1, wherein the ultrasonic radiation is applied in a frequency range between approximately 20 kHz and approximately 80 kHz.

3. The method according to claim 1, wherein the entrained gases are sulfite gases.

4. The method according to claim 1, wherein the entrained gases are alcohol gases.

5. The method according to claim 1, wherein the ultrasonic radiation is applied for between 15 minutes and 20 minutes.

6. The method according to claim 5, wherein the ultrasonic radiation is applied in a frequency range between approximately 20 kHz and approximately 80 kHz.

7. The method according to claim 1, wherein the application of ultrasonic radiation creates pressure amplitudes within the wine of at least 0.25 atm.

* * * * *